United States Patent
Todd et al.

(10) Patent No.: US 11,572,518 B2
(45) Date of Patent: Feb. 7, 2023

(54) CHAR PREPARATION SYSTEM AND GASIFIER FOR ALL-STEAM GASIFICATION WITH CARBON CAPTURE

(71) Applicants: Wormser Energy Solutions, Inc., Lancaster, MA (US); Energy & Environmental Research Center Foundation, Grand Forks, ND (US)

(72) Inventors: Douglas M. Todd, Galway, NY (US); John Parkes, Los Altos, CA (US); Scott G. Tolbert, Grand Forks, ND (US); Michael L. Swanson, Grands Forks, ND (US); Surya B. Reddy Karri, Naperville, IL (US); Teddy M. Knowlton, Willowbrook, IL (US)

(73) Assignees: Wormser Energy Solutions, Inc., Lancaster, MA (US); Energy & Environmental Research Center Foundation, Grand Forks, ND (US)

( * ) Notice: Subject to any disclaimer, the term of this patent is extended or adjusted under 35 U.S.C. 154(b) by 230 days.

(21) Appl. No.: 17/103,197

(22) Filed: Nov. 24, 2020

(65) Prior Publication Data

US 2021/0155860 A1    May 27, 2021

Related U.S. Application Data

(60) Provisional application No. 62/940,002, filed on Nov. 25, 2019.

(51) Int. Cl.
*C10J 3/56* (2006.01)
*C10J 3/78* (2006.01)
(Continued)

(52) U.S. Cl.
CPC .............. *C10J 3/56* (2013.01); *C10B 49/22* (2013.01); *C10J 3/723* (2013.01); *C10J 3/78* (2013.01);
(Continued)

(58) Field of Classification Search
CPC ....... C10J 3/56; C10J 3/723; C10J 3/78; C10J 2300/0916; C10J 2300/0976;
(Continued)

(56) References Cited

U.S. PATENT DOCUMENTS

| 2,582,711 A | 1/1952 | Nelson |
| 2,689,787 A | 9/1954 | Ogorzaly et al. |

(Continued)

FOREIGN PATENT DOCUMENTS

| CA | 2740315 A1 | 4/2010 |
| CN | 1272870 | 11/2000 |

(Continued)

OTHER PUBLICATIONS

Mark Sceats, The Endex Configuaration for CaO Looping Reactors, Sep. 2009, Calix Ltd.

(Continued)

*Primary Examiner* — Matthew J Merkling
(74) *Attorney, Agent, or Firm* — Rauschenbach Patent Law Group, LLC; Kurt Rauschenbach

(57) ABSTRACT

An ASG system for polygeneration with CC includes a devolatilizer that pyrolyzes solid fuel to produce char and gases. A burner adds exothermic heat by high-pressure sub-stoichiometric combustion, a mixing pot causes turbulent flow of the gases to heat received solid fuel, and a riser micronizes resulting friable char. A devolatilizer cyclone separates the micronized char by weight providing micronized char, steam and gases to a gasifier feed and oversized char to the mixing pot. An indirect fluid bed gasifier com- (Continued)

bustion loop includes a gasifier coupled to the gasifier feed, a steam input to provide oxygen for gasification and to facilitate sand-char separation, and an output for providing syngas. A burner provides POC to a mixing pot which provides hot sand with POC to a POC cyclone via a riser, where the POC cyclone separates sand and POC by weight and provides POC and sand for steam-carbon reaction.

16 Claims, 4 Drawing Sheets

(51) Int. Cl.
 C10J 3/72 (2006.01)
 C10B 49/22 (2006.01)
 C10K 3/04 (2006.01)
(52) U.S. Cl.
 CPC ............ *C10K 3/04* (2013.01); *C10J 2200/39* (2013.01); *C10J 2300/093* (2013.01); *C10J 2300/094* (2013.01); *C10J 2300/0916* (2013.01); *C10J 2300/0946* (2013.01); *C10J 2300/0956* (2013.01); *C10J 2300/0966* (2013.01); *C10J 2300/0969* (2013.01); *C10J 2300/0976* (2013.01); *C10J 2300/1223* (2013.01); *C10J 2300/1246* (2013.01); *C10J 2300/1606* (2013.01); *C10J 2300/1612* (2013.01); *C10J 2300/1653* (2013.01); *C10J 2300/1662* (2013.01); *C10J 2300/1807* (2013.01); *C10J 2300/1853* (2013.01)
(58) Field of Classification Search
 CPC ........ C10J 2300/1223; C10J 2300/1612; C10J 2300/1653; C10J 2300/1662; C10J 2300/1853
 See application file for complete search history.

(56) References Cited

U.S. PATENT DOCUMENTS

| | | | |
|---|---|---|---|
| 2,772,954 A * | 12/1956 | Jequier | C10B 49/08 48/202 |
| 3,373,562 A | 3/1968 | Wormser | |
| 3,988,237 A | 10/1976 | Davis et al. | |
| 4,002,438 A * | 1/1977 | Fleming | B01J 8/1854 48/76 |
| 4,003,691 A | 1/1977 | Wormser | |
| 4,013,395 A | 3/1977 | Wormser | |
| 4,051,791 A | 10/1977 | Wormser | |
| 4,135,885 A | 1/1979 | Wormser | |
| 4,149,559 A | 4/1979 | Wormser | |
| 4,253,409 A | 3/1981 | Wormser | |
| 4,279,205 A | 7/1981 | Perkins et al. | |
| 4,279,207 A | 7/1981 | Wormser | |
| 4,303,023 A | 12/1981 | Perkins et al. | |
| 4,400,181 A | 8/1983 | Snell et al. | |
| 4,499,857 A | 2/1985 | Wormser | |
| 4,578,175 A | 3/1986 | Gorin | |
| 4,823,712 A | 4/1989 | Wormser | |
| 5,122,346 A | 6/1992 | Wormser | |
| 5,236,354 A | 8/1993 | Goldbach et al. | |
| 5,469,698 A | 11/1995 | Garcia-Mallol | |
| 5,536,488 A | 7/1996 | Mansour et al. | |
| 5,655,853 A | 8/1997 | Wormser | |
| 5,688,296 A | 11/1997 | Andrus et al. | |
| 5,728,361 A | 3/1998 | Holley | |
| 5,917,136 A | 6/1999 | Gaffney et al. | |
| 5,997,220 A | 12/1999 | Wormser | |
| 6,863,820 B2 | 3/2005 | Cabrera et al. | |
| 6,877,322 B2 | 4/2005 | Fan | |
| 7,314,847 B1 | 1/2008 | Siriwardane | |
| 7,951,350 B1 * | 5/2011 | Taylor | C10K 1/06 423/418.2 |
| 8,110,523 B2 | 2/2012 | Ryu et al. | |
| 9,174,844 B2 | 11/2015 | Ramkumar et al. | |
| 9,873,840 B2 | 1/2018 | Wormser | |
| 10,443,005 B2 | 10/2019 | Wormser et al. | |
| 10,570,348 B2 | 2/2020 | Wormser et al. | |
| 2002/0117564 A1 | 8/2002 | Hahn et al. | |
| 2004/0045272 A1 | 3/2004 | Miyoshi et al. | |
| 2004/0123601 A1 | 7/2004 | Fan | |
| 2004/0237404 A1 | 12/2004 | Andrus et al. | |
| 2006/0000143 A1 | 1/2006 | Suichi et al. | |
| 2006/0207177 A1 | 9/2006 | Andrus et al. | |
| 2006/0260189 A1 | 11/2006 | Reddy et al. | |
| 2007/0256359 A1 | 11/2007 | Wiltowski | |
| 2008/0021251 A1 | 1/2008 | Laccino et al. | |
| 2008/0119356 A1 | 5/2008 | Ryu | |
| 2009/0217585 A1 | 9/2009 | Raman et al. | |
| 2010/0050654 A1 | 3/2010 | Chiu et al. | |
| 2010/0181539 A1 | 7/2010 | Apanel et al. | |
| 2010/0281878 A1 | 11/2010 | Wormser | |
| 2010/0329963 A1 | 12/2010 | Sceats et al. | |
| 2012/0000175 A1 | 1/2012 | Wormser | |
| 2012/0164032 A1 | 6/2012 | Wormser | |
| 2012/0167585 A1 | 7/2012 | Wormser | |
| 2012/0247080 A1 | 10/2012 | Ishii et al. | |
| 2012/0267577 A1 | 10/2012 | Sceats et al. | |
| 2013/0239479 A1 * | 9/2013 | Gao | C10B 49/10 48/89 |
| 2014/0044632 A1 | 2/2014 | Zielinski et al. | |
| 2014/0158939 A1 | 6/2014 | Ramkumar et al. | |
| 2014/0296586 A1 | 10/2014 | Chandran et al. | |
| 2014/0314629 A1 * | 10/2014 | Lee | C10J 3/48 422/139 |
| 2014/0352581 A1 | 12/2014 | Abanades Garcia et al. | |
| 2015/0013575 A1 | 1/2015 | Yazdanpanah et al. | |
| 2017/0003732 A1 | 1/2017 | Wendel et al. | |
| 2017/0037328 A1 * | 2/2017 | Wormser | C10B 49/10 |
| 2017/0096335 A1 | 4/2017 | Wormser | |
| 2018/0073430 A1 | 3/2018 | Forrest et al. | |
| 2020/0002631 A1 * | 1/2020 | Wormser | C01B 3/38 |
| 2020/0148963 A1 * | 5/2020 | Wormser | C10J 3/82 |
| 2021/0347638 A1 | 11/2021 | Wormser et al. | |
| 2022/0073828 A1 | 3/2022 | Todd et al. | |

FOREIGN PATENT DOCUMENTS

| | | |
|---|---|---|
| CN | 1407948 A | 4/2003 |
| CN | 1642620 A | 7/2005 |
| CN | 1676210 | 10/2005 |
| CN | 1795257 A | 6/2006 |
| CN | 1903431 A | 1/2007 |
| CN | 101235321 A | 8/2008 |
| CN | 101269320 A | 9/2008 |
| CN | 101378826 A1 | 3/2009 |
| CN | 101443275 A | 5/2009 |
| CN | 102549119 A | 7/2012 |
| CN | 102575178 A | 7/2012 |
| CN | 102665871 A | 9/2012 |
| CN | 203096004 U | 7/2013 |
| CN | 114729275 A | 7/2022 |
| EP | 0 067 580 A1 | 12/1982 |
| EP | 0 227 550 A2 | 7/1987 |
| EP | 0274637 A1 | 7/1988 |
| EP | 0619455 A2 | 10/1994 |
| EP | 2457636 A1 | 5/2012 |
| EP | 2484971 A1 | 8/2012 |
| JP | 2006-300476 | 11/2006 |
| TW | 245651 | 4/1995 |
| TW | 280849 | 7/1996 |
| TW | 442572 | 6/2001 |
| TW | I237103 B | 8/2005 |
| WO | 02/50214 A2 | 6/2002 |
| WO | 2006/044317 A2 | 4/2006 |
| WO | 2007/045048 A1 | 4/2007 |
| WO | 2007/123776 A2 | 11/2007 |
| WO | 2008/157433 A2 | 12/2008 |
| WO | 2009/039393 A2 | 3/2009 |
| WO | 2010045232 A2 | 4/2010 |

(56) References Cited

FOREIGN PATENT DOCUMENTS

| WO | 2011035241 A1 | 3/2011 |
|---|---|---|
| WO | 2011047409 A1 | 4/2011 |
| WO | 2013062800 A1 | 5/2013 |
| WO | 2013-109616 A1 | 7/2013 |
| WO | 2021/108395 A1 | 6/2021 |

OTHER PUBLICATIONS

K. Fouhi, Coal Comes Back, Chemical Engineering, Aug. 1, 1991, pp. 47-48ccc, vol. 98, No. 8, Access Intelligence Association, Rockville, MA, US.

Andrus, et al., Alstom's Calcium Oxide Chemical Looping Combustion Coal Power Technology Development, May 31-Jun. 4, 2009, 12 pages, the 34th International Technical Conference on Clean Coal & Fuel System, Clearwater, Florida.

Rietveld, et al., Commercialization of the ECN Milena Gasification Technology, Jun. 2014, 21 pages.

Twin IHI Gasifier (TIGAR®), Current Status of Indonesia Demostration Project and its Business Plan, Oct. 18, 2016, 19 pages, IHI Corporation, Vancouver, Canada.

Butler, Limestone as a Sorbent for CO2 Capture and its Application in Enhanced Biomass Gasification, Oct. 2013, 279 pages, The University of British Columbia, Vancouver, Canada.

Fan, Preparation of Calcium Oxide-Based absorbent and its CO2 absorption Performance, China Excellent Master's Thesis Full-text Database, Engineering Technology Series I, May 15, 2017, No. 05, pp. B016-241.

Ahn, et al. Review of Supercritical CO2 Power Cycle Technology and Current Status of Research and Development, Nucl Eng Technol, 2015, pp. 647-661, vol. 47, Elsevier.

"Notification of Transmittal of the International Search Report and the Written Opinion of the International Searching Authority, or the Declaration" for International Patent Application No. PCT/US2020/061994, dated Mar. 16, 2021, 10 pages, ISA/KR, Korean Intellectual Property Office, Daejeon, Republic of Korea.

"International Preliminary Report on Patentability" received for PCT Application Serial No. PCT/US2020/061994 dated Jun. 9, 2022, 07 pages.

Carpenter et al., "Pilot-Scale Gasification of Corn Stover, Switchgrass, Wheat Straw, and Wood: 1. Parametric Study and Comparison with Literature", Ind. Eng. Chem. Res., vol. 49, No. 4, 2010, pp. 1859-1871.

* cited by examiner

CHAR PREPARATION SYSTEM AND GASIFIER FOR ALL-STEAM GASIFICATION WITH CARBON CAPTURE

CROSS REFERENCE TO RELATED APPLICATION

The present application is a non-provisional application of U.S. Provisional Patent Application No. 62/940,002, filed on Nov. 25, 2019, entitled "Char Preparation System and Gasifier for All-Steam Gasification with Carbon Capture". The entire contents of U.S. Provisional Patent Application No. 62/940,002 are herein incorporated by reference.

The section headings used herein are for organizational purposes only and should not be construed as limiting the subject matter described in the present application in any way.

INTRODUCTION

Global warming concerns about $CO_2$ greenhouse gas accumulation in the atmosphere continue to grow. Atmospheric concentrations of $CO_2$ are higher now than in any of the last several hundred thousand years. $CO_2$ emissions from fossil fuel energy generation systems are a major culprit in the recent few decades of increasing $CO_2$ in the atmosphere. At the same time, the demand for and use of fossil fuels worldwide continues to grow. Even with major increases in renewables and nuclear energy sources, the growth of fossil fuel consumption continues to rise. As such, there is a significant need for efficient and effective low-carbon technologies, especially for power generation from Hydrogen and/or chemical production.

Integrated gasification combined cycle (IGCC) technology is the cleanest way to make energy from coal. Gasification results in significantly fewer pollutants than produced by conventional coal power plants. An IGCC power plant burns hydrogen rich syngas in a turbine to produce electricity. The excess heat is captured to power a second turbine that produces more electricity, resulting in high-efficiency power generation. Gasification of various solid fuels to produce chemicals including hydrogen, fertilizers, methanol, diesel fuel, and many other chemicals is common today. Gasification is beneficial to the environment, resulting in less pollution, reduced carbon dioxide emission, less solid waste, and lower water use.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
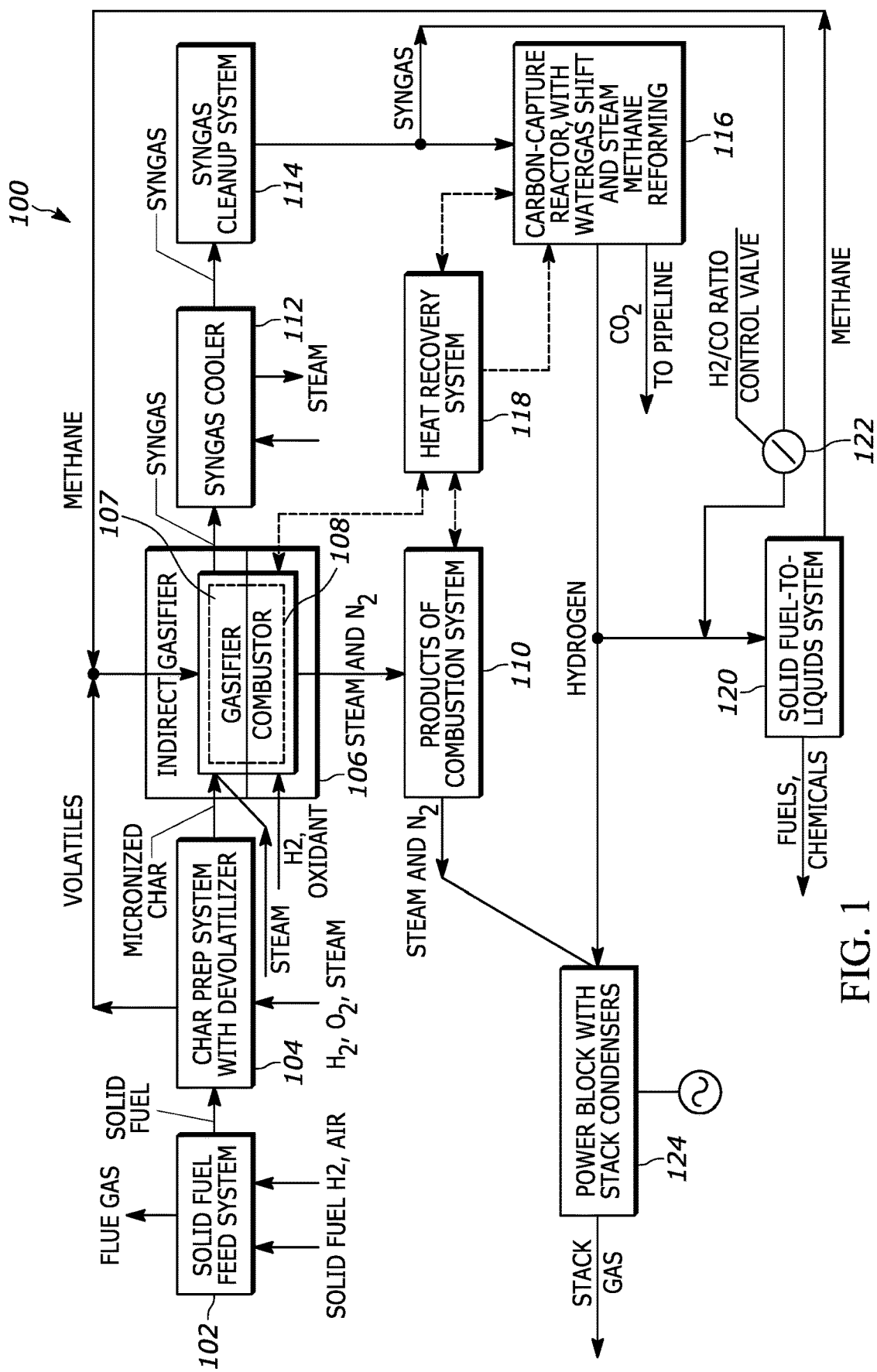
FIG. 1 illustrates a system block diagram of an all-steam gasification for a polygeneration application with carbon capture system according to the present teaching.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Global warming and climate change issues are requiring that coal power plants worldwide add expensive controls to capture and store $CO_2$ in order to meet desired emission rates. Current technologies such as IGCC with carbon capture (CC) for coal plants have proven uneconomical without subsidies. The additional power required to run the carbon capture systems reduces efficiency, and consequently widespread adoption has not occurred. This has led to the shutdown of older coal plants and cancellation of many new plants. Still, many experts believe that coal is a valuable energy source to assist in transitioning the world to renewable energy sources.

The present teaching relates to improvements in all-steam gasification system with carbon capture, which can substantially improve both cost and efficiency, and hasten widespread adoption of integrated gasification combined cycle (IGCC) technology. Various aspects of the present teaching relate to the combination and process intensification of matching technologies. Using all-steam gasification (ASG) where the oxygen for gasification and to produce hydrogen comes from steam not an air separation plant combined with an indirect gasifier has numerous advantages because it can supply a source of heat for gasification by the complete combustion of fuel using air. This is accomplished by using an indirect gasifier to keep the products of combustion from mixing with the syngas allowing nitrogen free syngas. This process increases the amount of net hydrogen produced per pound of carbon in the gasifier. Since hydrogen is the carbon-free fuel needed with carbon capture, the increased yield of hydrogen and the use of air instead of oxygen increases IGCC plant efficiency with carbon capture, from about 32% for a conventional system with carbon capture, to about 43% Higher Heating Value (HHV) with the new system. This is greater than 30% more power per pound of coal while capturing more than 90% of the carbon for storage. Due to unique designs in each of the subsystems, there is also an even greater reduction of cost, for both fuel and capital.

A carbonaceous fuel gasification system according to the present teaching includes a micronized char preparation system comprising a devolatilizer that receives solid carbonaceous fuel, hydrogen, oxygen, and fluidizing steam. For example, the solid carbonaceous fuel can be coal, biomass and/or plastic material. The micronized char preparation system produces micronized char, steam, volatiles, and hydrogen at one or more outlets. In some embodiments, the micronized char preparation system includes a counter-flow char cooler that preheats steam as it cools the char, a pressure let-down valve, a pulverizer that reduces the average size of the micronized char to under 10μ, and an airlock that re-pressurizes the micronized char to the inlet.

In some systems, the devolatilizer comprises a heated pressure vessel comprising an inlet for injecting fluidizing steam, and at least one outlet for removing volatiles and coarse char. The char preparation system can include cyclones that separate course char and ash from gases. The cyclones have an outlet that is coupled to an input of an indirect gasifier that is positioned downstream of the devolatilizer. Process intensification that combines multiple functions into a single device has been used to include a micronizing function in this device.

The indirect gasifier includes a vessel comprising a gasification chamber that receives the micronized char from the micronized char preparation system, and that receives a conveying fluid, and steam. The gasification chamber is also sometimes referred to as a gasifier. In this embodiment, the indirect gasifier receives volatiles from the outlet of the micronized char preparation system. In some embodiments, the gasification chamber receives steam from an outlet of the micronized char preparation system. Also, in some embodiments, the gasification chamber (gasifier) has an outlet that is coupled to an inlet of a heat recovery system so that the heat recovery system receives steam from the gasification system. The gasification system produces syngas, ash, and steam at one or more outlets.

The indirect gasifier also includes a combustion chamber. The combustion chamber is sometimes referred to as a combustor. The combustion chamber receives a mixture of hydrogen and oxidant and burns the mixture of hydrogen and oxidant to provide heat for gasification and for heating incoming flows, thereby generating steam and nitrogen. For example, the oxidant can be air. In some embodiments, the oxidant is oxygen or oxygen and $CO_2$ using syngas as the fuel. The heat for gasification is transferred from the combustion chamber to the gasification chamber by circulating refractory sand. In some embodiments, the steam and nitrogen or steam and $CO_2$ generated by the indirect gasifier's combustor are directed to a gas turbine power generation system. In some embodiments, the steam and nitrogen generated by the combustion chamber of the indirect gasifier are directed to an expander connected to an electrical generator, to stack condensers in a power block, and is then exhausted at a system stack.

In various embodiments, the carbonaceous fuel gasification system can further include cyclones that are positioned downstream of the gasifier to separate sand and ash from gases. Also, the carbonaceous fuel gasification system can further include a syngas cooler having an inlet coupled to the outlet of the gasification chamber of the indirect gasifier, where the syngas cooler cools the syngas. In some embodiments, steam can be generated at an outlet. A syngas cleanup system having an input that receives the cooled syngas from the outlet of the syngas cooler can be used to remove impurities. One particular embodiment uses a Warm Gas Clean Up (WGCU) to fit with the capture system A carbon capture system having an input that is coupled to the outlet of the syngas clean-up system can be used to generate carbon dioxide and hydrogen. Also, in some embodiments, a solid fuel-to-liquids system or other chemical making device is coupled to the outlet of the carbon capture that provides hydrogen.

There are numerous advantages to the carbonaceous fuel gasification system configuration of the present teaching including that the char preparation system eliminates the previous counter-flow char cooler that preheats steam as it cools the char, along with the pressure let-down valve, the pulverizer mill that reduces the average size of the micronized char to under 10μ, and the airlock that re-pressurizes the micronized char to the gasifier inlet pressure. This greatly simplifies and reduces the cost of the system leading to a highly practical commercial system.

In addition, the all-steam gasification system produces a larger quantity of hydrogen per pound of coal or other feedstock compared with other known methods. The use of air and hydrogen for gasification heat eliminates the large expensive air separation plant for producing oxygen, normally used for such systems, significantly improving efficiency and cost. An indirect gasifier enables nitrogen-free hydrogen necessary for polygeneration of liquids and chemicals while maintaining power-only and Coal-to-Liquid (CTL)-only-modes by keeping air from mixing with the critical streams.

Furthermore, the use of micronized char produced in a devolatilizer/char preparation system helps to enable gasification of the feedstock in seconds. This significantly reduces the gasification plant size and provides increased capacity in modularized equipment. A calcium looping system with integral water gas shift, using high temperature fixed beds and limestone-based sorbents enhances the overall carbon capture system and can result in pipeline-quality, high-pressure CO2. Such systems avoid the need for steam to regenerate the sorbents used to capture carbon dioxide. Integrated high temperature heat recovery systems using specialized high temperature heat exchangers support the overall system with very high efficiency. Finally, such systems can utilize known warm-gas clean-up systems that produce near-zero emissions, easing air pollution while reducing temperature cycling.

FIG. 1 illustrates a system block diagram of an all-steam gasification with carbon capture system 100 according to the present teaching. The all-steam gasification with carbon capture system 100 is suitable for use in polygeneration. In polygeneration, either power or chemicals or both are made from solid fuels, such as coal. Although many aspects of the present teaching are described in connection with the use of coal, one skilled in the art will appreciate that the present teaching is not limited to coal and that numerous other solid fuels can also be used. For example, biomass, peat, wood, wood pellets, charcoal and plastics can be used.

The embodiment of the all-steam gasification with carbon capture system 100 shown in FIG. 1 includes a coal feed system 102 that takes in coal, $H_2$ and air, and emits flue gas. Some embodiments of the coal feed system 102 use a rotary valve feeder or dry solids pump and a fluid bed coal drier with a mixer. The coal feed system 102 provides solid fuel to a char preparation system 104. The char preparation system 104 includes a devolatilizer with an internal pulverizing function.

One feature of the present teaching is the production of micronized char that advantageously speeds the gasification process and reduces system contamination. The char preparation system 104 prepares micronized char from the coal received from the coal feed system 102 and transfers it to the indirect gasifier 106. To produce micronized char from embodiments of the char preparation system that use coal, the char preparation system 104 receives crushed coal with a size suitable for fluidization. In some embodiments, the fluidization size is less than ¼-inch. Then the crushed coal is micronized in the devolatilizer.

Although it is possible to gasify coal directly without using a char preparation system 104, it is preferable in some systems to first convert the coal into char and then gasify the char. This is because char is much more brittle than coal since most of the interior of the coal particles have been hollowed out by pyrolysis. Pyrolysis produces char particles with a range of geometries. Char particle geometry may comprise a thin-shell sphere. The char particle geometry may also be similar to Swiss cheese in form. The hollowed-out geometry causes char particles to break into far smaller pieces when pulverized than coal. Particles below ten microns are readily achieved. Some particles of pulverized char are ten-times smaller in diameter, and 1000-times smaller in volume, than pulverized coal. The small size of pulverized char particles hastens gasification, which increases viability.

A second feature of using micronized char of the present teaching is that it is non-wetting. Micronized char is non-wetting because the particles remain entrained in the gases in which they flow, rather than colliding with each other or other surfaces. The non-wetting feature avoids the fouling, clinkering, agglomeration, and corrosion common in prior art coal-fired power systems using pulverized coal as the solid fuel.

The indirect gasifier 106 of the present teaching produces syngas from the micronized char. Prior art indirect gasifiers have been used principally to make methane from biomass. As illustrated in FIG. 1, the heat for the reactions in indirect gasifier 106 is created by combustion in one chamber 108, and gasification occurs in the other chamber 107. The combustion chamber of the gasifier/combustor 108 is sometimes referred to as a combustor. The gasifier chamber of the indirect gasifier 107 may also be referred to as a gasifier. The gases emerging from each chamber are kept separated. The heat transfer between the chambers required for gasification is provided by circulating hot solids. The hot solids are heated in the combustor 108 and cooled by gasification in the gasifier 107. In some embodiments, the hot circulating solid is flowing refractory sand.

One feature of using the indirect gasifier 107 of the present teaching is that it makes all-steam gasification (ASG) with air possible for applications where nitrogen free syngas is required. Using ASG with air is desirable because indirect gasification eliminates the need for an oxygen plant, also known as an air separation unit (ASU) for fuels production. This is because the products of combustion (POC) are kept separate from the syngas, thereby avoiding the contamination of the syngas by nitrogen in the combustion air. Eliminating the need for an oxygen plant saves a considerable about of cost in construction of the system as reducing the space requirements. Also, indirect gasification creates an improvement in both the efficiency, in the form of a large reduction in auxiliary power required, and the costs of gasification systems used to produce chemicals resulting in considerable ongoing cost savings. An additional important feature of using the indirect gasifier 106 of the present teaching is that the use of hydrogen in the combustion chamber for providing gasification heat by complete combustion allows all the carbon in the coal to be used to produce the maximum amount of hydrogen per pound of coal.

The indirect gasifier 106 receives steam and micronized char from the char preparation system 104. The indirect gasifier combustor 108 receives oxidants and $H_2$. The indirect gasifier also uses volatiles and methane provided by the char preparation system 104. The indirect gasifier combustor 108 produces steam and nitrogen as products of combustion 110. The indirect gasifier produces syngas that is provided to a syngas cooler 112. The syngas cooler 112 cools hot syngas leaving the indirect gasifier 107 to the temperature required by the syngas cleanup system 114.

The syngas cleanup system removes pollutants and sends the syngas to a carbon-capture reactor 116. The carbon capture system 116 uses process intensification to combine multiple function in one fixed bed, pressure swing alternating vessel. These functions can include (1) steam reforming to produce hydrogen from methane; (2) Water Gas Shift (WGS) to produce hydrogen from CO and steam; and (3) Calcium Looping Carbonation (CLC) to capture $CO_2$ and calcining to release $CO_2$. The carbon-capture reactor 116 produces $CO_2$ that is sent to a pipeline. The carbon-capture reactor 116 also produces hydrogen and/or high-hydrogen syngas. Oxygen and, alternatively, spray cooling can be used to adjust temperature in the capture system.

An integrated high temperature heat recovery system 118 provides the steam heating for the gasifier steam and also provides throttle steam for a steam turbine used for power generation. The heat recovery system 118 efficiently recovers the high temperature heat from the water gas shift reaction in the carbon-capture reactor 116. The indirect gasifier 106 can use heat provided by the heat recovery system 118. Also, the carbon-capture reactor 116 can use heat provided by the heat recovery system 118.

It is anticipated that many all-steam gasification with carbon capture systems that use the char preparation system according to the present teaching have the ability to produce chemicals, such as hydrogen and liquid fuels, methanol, ammonia, and urea, in addition to providing power. Hydrogen and/or high hydrogen syngas produced by the carbon-capture reactor 116 can be sent to a coal-to-liquids system 120. For example, the coal-to-liquids system 120 can be a conventional Fischer Tropsch converter.

The coal-to-liquids system 120 can provides an additional adjustment of the hydrogen-to-carbon-monoxide ratio by controlling the bypass around the carbonator in the carbon-capture reactor 116 using a control valve 122.

In some embodiments of the system of the present teaching, the hydrogen from the carbon-capture reactor is also sent to a power block 124. The power block 124 includes a stack condenser for the stack gas that recovers the moisture created by the combustion of the hydrogen. The power block 124 uses steam and $N_2$ from the products of combustion 110. This is important to dilute the hydrogen fuel to reduce flame temperatures to temperatures suitable for modern gas turbines. The stack condensers can provide a system with low water usage compared to conventional IGCCs because the amount of steam required for gasification to produce hydrogen is large and because the power block uses the hydrogen as fuel so there is a large component of water vapor in the gas turbine stack. Condensation is made feasible by the very low sulfur dioxide in the syngas due to the high efficiency of the syngas cleanup system 114. The very low sulfur dioxide content syngas also eliminates the corrosion of the stack that would otherwise occur. The power block 124 typically would include a relatively large sized steam turbine to accommodate the many steam sources other than the gas turbine heat recovery steam generator.

Air extraction from a gas turbine for process air flows is used in many known conventional integrated gasification combined cycle (IGCC). The optimal amount of air extraction depends on economic and operating considerations. Some embodiments of the power block 124 of the present teaching use a different amount of air extraction as compared to known power blocks. This is, at least in part, because hydrogen is used as the principal fuel and the products of combustion system 110 flows of steam and nitrogen are returned to the gas turbine in the power block 124. As such, the optimum amount of air extraction is different from any known IGCC air extraction systems. Embodiments of the power block 124 used for various polygeneration applications such as heating, cooling and electricity production, will also use a different optimum amount of air extraction than most known IGCC.

The all-steam gasification with carbon capture system 100 of FIG. 1 includes the key subsystems necessary to gasify a solid or liquid fuel. The solid fuel coal is used to illustrate the teaching, but it is understood that numerous other solid fuels could be used. Furthermore, alternative embodiments may contain only some of the subsystems illustrated in the embodiment of FIG. 1, as would be well known to those familiar with the state of the art. For example, in embodiments in which power only is required, the coal-to-liquid 120 system would not be needed. Also, in embodiments that require only coal-to-liquid, or solid fuel-to-liquid, the power block 124 may be omitted depending up on the configuration.

Figure 2:
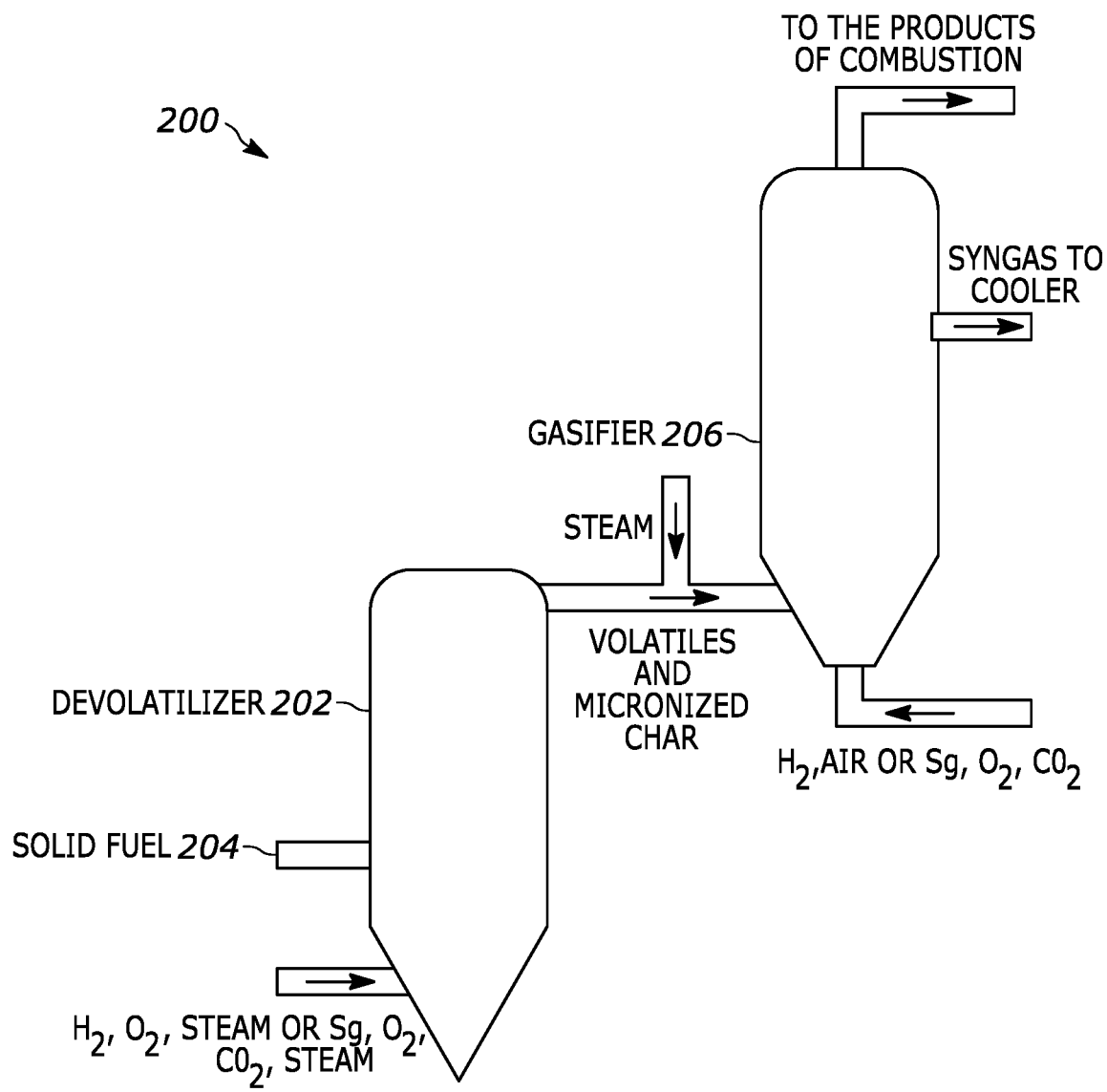
FIG. 2 illustrates an embodiment of a char preparation gasifier system of the present teaching.

FIG. 2 illustrates an embodiment of a char preparation and gasifier system 200 of the present teaching. The system includes a devolatilizer 202 and a gasifier 206 in a direct connection configuration. Solid carbonaceous fuel 204, such as coal, is fed directly to the devolatilizer 202 while a gaseous fuel, such as hydrogen or syngas, along with an oxidant and steam is fed to a burner to provide heat for pyrolysis. The outlet of the devolatilizer 202 can be fed directly to the gasifier 206. Additional steam is also fed to the gasifier 206. Gaseous fuel, such as hydrogen or syngas, along with an oxidant is fed to a combustor to provide heat for gasification. Some method of the present teaching use methane for gasifier heat but these methods can have reduced carbon capture capability. The products of combustion (POC) are exhausted to a POC System while syngas is sent to a syngas cooler for cooling to a temperature low enough for removal of alkali materials which can damage downstream gas turbines.

An all-steam gasification system for polygeneration with carbon capture according to the present teaching includes a devolatilizer that pyrolyzes solid fuel to produce char and gases that includes a burner that adds exothermic heat to gasses by high-pressure sub-stoichiometric combustion to reduce or eliminate oxidation of char in the devolatilizer, a mixing pot that causes turbulent flow of hot gases provided by the burner to heat received solid fuel, and a riser that micronizes resulting friable char. A devolatilizer cyclone separates the micronized char by weight providing sufficiently micronized char, steam and pyrolysis gases to a gasifier feed and providing oversized micronized char a recycling input of the mixing pot. An all-steam indirect fluid bed gasifier combustion loop includes a gasifier coupled to devolatilizer gasifier feed, an input for receiving steam to provide oxygen for gasification reactions and to facilitate sand-char separation, and an output that provides syngas. A burner provides POC to a mixing pot which provides hot sand with POC to a POC cyclone via a riser, where the POC cyclone separates hot sand and POC by weight and provides POC and sand for a steam-carbon reaction.

Figure 3:
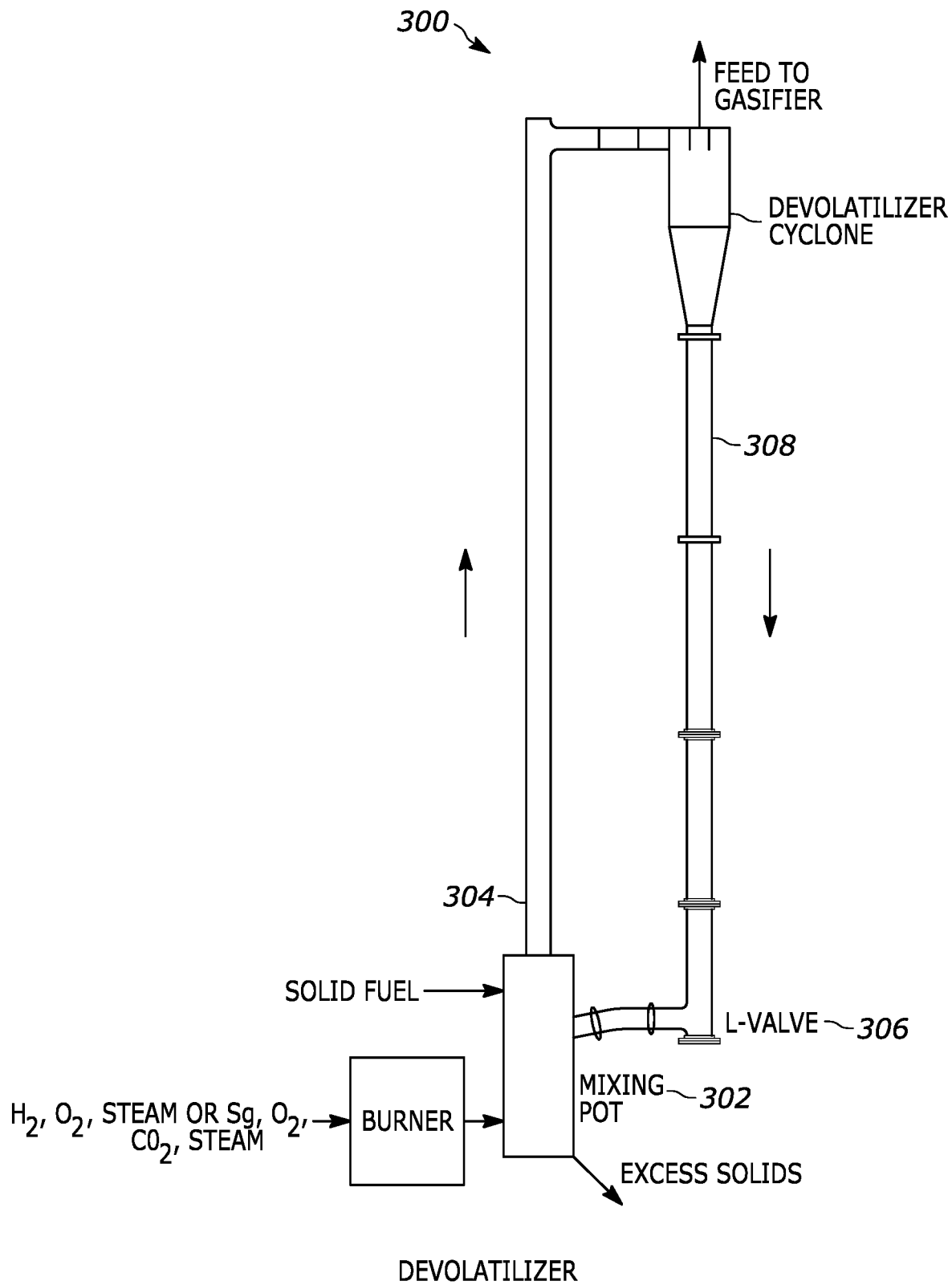
FIG. 3 illustrates an embodiment of a devolatilizer of the present teaching.

FIG. 3 illustrates an embodiment of a devolatilizer 300 of the present teaching. The devolatilizer 300 is situated within the char preparation system. The indirectly heated all-steam gasifier (ASG) requires small char particles to facilitate rapid conversion. One aspect of the present teaching is the utilization of a fast circulating fluid-bed contactor as both the high-temperature pyrolyzer and char pulverizer, which we refer to as the devolatilizer.

In one embodiment according to the present teaching, the devolatilizer is configured to have a mixing pot 302 at its bottom and then a high-velocity riser 304 on top of the mix pot which operates in the turbulent fluidized-bed mode. The rapid heating of the coal in the mix pot/riser causes the coal to swell up rapidly and become friable. The high velocity in the riser micronizes the friable char into particles that are in the 10- to 20-μm range as the high velocity solids impact on the corner at the top of the riser and on the wall of the devolatilizer cyclone. Solids that are not fine enough to escape the cyclone are recycled back into the bottom of the mix pot/riser. In various embodiments a single or a multistage cyclone such as a two-stage cyclone are used.

Exothermic heat is added to the process via the high-pressure sub stoichiometric combustion of recycled syngas or hydrogen and oxygen in a separate standalone burner. Steam is also injected into this separate stand-alone burner to superheat the combustion. As a result, none of the circulating char is oxidized in the mixing pot 302. The inlet gas temperature is typically limited to ~2000° F. to prevent bed agglomeration due to localized hot spots.

The configuration shown in FIG. 3 incorporates a relatively short riser section to facilitate the requirement for achieving only devolatilizing and reduction of the size of coal particles, as compared to functions of a typical fluidized bed gasifier. Higher operating velocities are used to promote rapid particle mixing and heat-up to achieve fast devolatilization. The higher operating velocities will also facilitate rapid fuel particle-size reduction in the flooded elbow and through the cyclones.

The solids circulation into the mixing zone is controlled by fluffing gas in the standpipe, L-valve 306 aeration flows, and solids level in the standpipe 308. In some embodiments, the L-valve 306 is a non-mechanical solid flow device which controls the solids flow rate around the gasifier/combustor loop. The quantity and quality of pulverized char and pyrolysis gas leaving the devolatilizer 300 is a function of the operating velocity, solids circulation rate, gas density, and operating temperature of the system. The micronized char, micronized ash, and devolatilized gases are then transferred into the bottom of a fluidized, bubbling-bed gasifier.

It is often desirable to keep the total facility height low. This can be achieved in part by using a refractory lined pipe to transfer the devolatilizer char and pyrolysis gases to the bottom of the ASG gasifier, which will be located at a similar height adjacent to the devolatilizer 300.

Crushed coal or another solid fuel is first fed into a mixing pot 302. Hydrogen and oxygen are input and burned using a combustor at the bottom of the reactor. The solids circulation into the mixing zone is controlled by fluffing gas in the standpipe, J-leg aeration flows, and solids level in the standpipe. The quantity and quality of pulverized char and pyrolysis gas leaving the devolatilizer will be a function of the operating velocity, solids circulation rate, gas density, and operating temperature of the system. The micronized char, micronized ash, and devolatilized gases are then transferred through one or more cyclones into the bottom of a fluidized, bubbling-bed gasifier. The overhead bed also thermally cracks the tars in the volatiles, rendering them into gaseous hydrocarbons such as methane. Steam is used to fluidize the bed. Oxygen is used instead of air in the devolatilizer to avoid the contamination of the volatiles by the nitrogen from the air. This allows the nitrogen-free syngas to be used for polygeneration or to produce coal-to-liquids.

In some methods according to the present teaching, a devolatilizer additive is injected into the devolatilizer in order to neutralize the effect of sodium-based contaminants. The devolatilizer additive prevents and reduces undesirable deposits that are common in known integrated gasification combined cycle (IGCC) coolers and candle filters.

Figure 4:
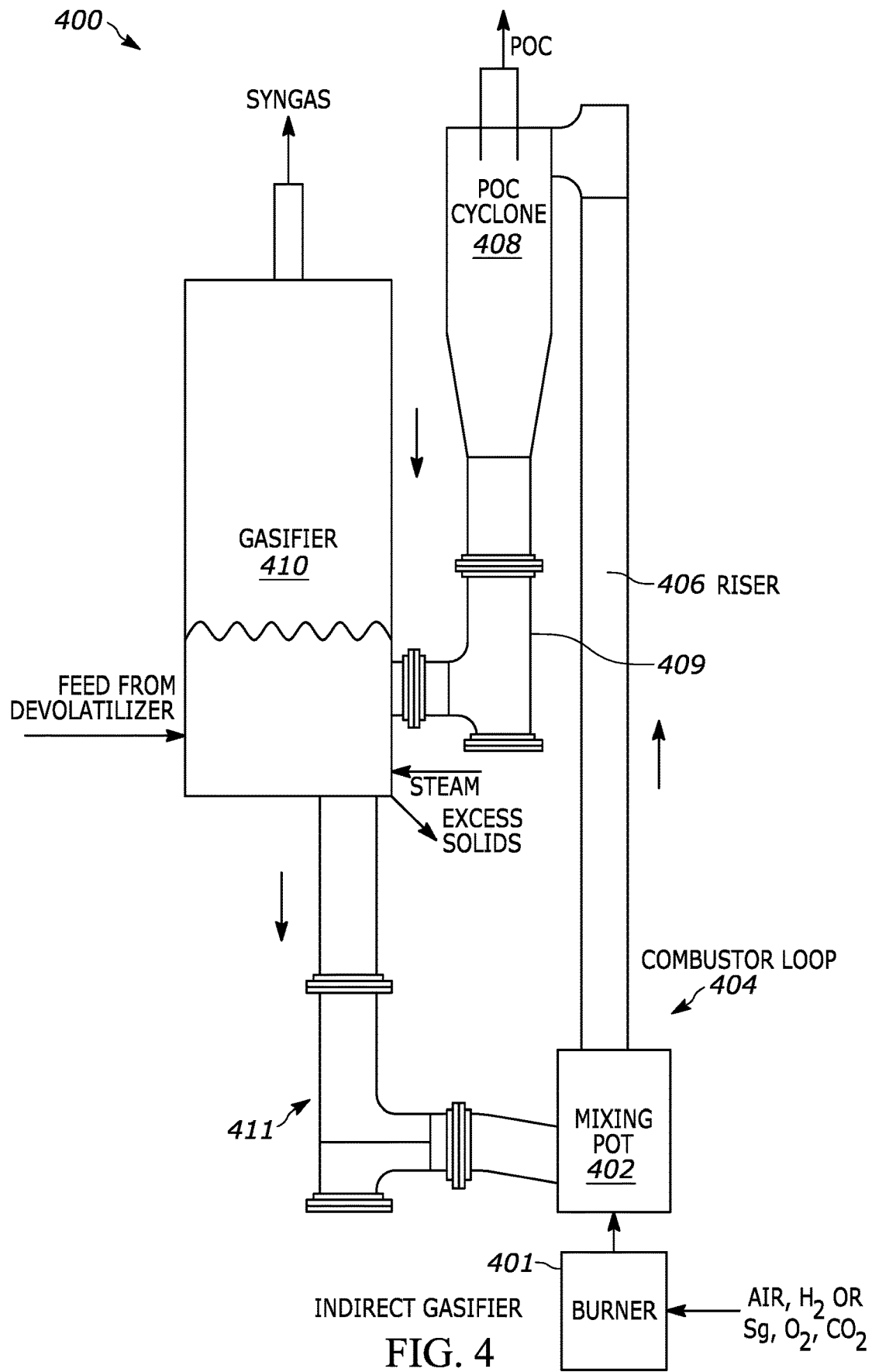
FIG. 4 illustrates an embodiment of an indirect gasifier of the present teaching.

FIG. 4 illustrates an embodiment of an ASG indirect gasifier 400 of the present teaching. The ASG indirect gasifier 400 configuration is a side-by-side circulating loop connecting a circulating fluid bed which is heated by combusting. Micronized char is entrained in the gas flow from the devolatilizer downward and into the main all steam gasifier (ASG). The ability to entrain the micronized char in the devolatilizer's exit gas stream is one factor that allows a reduction in the overall height of the entire system, which results in a significant capital cost savings with no corresponding increase in operational costs.

The combustor loop section 404 of the indirect gasifier 400 is used to generate the required heat for the reaction. The circulating fluid bed uses the combusting of hydrogen-rich syngas with air to heat sand in the mixing pot 402 at the bottom of the fluid bed's riser section 406. Alternatively, for various oxy-fired applications, syngas can be combusted with an oxygen-carbon dioxide mixture. The circulating fluid bed is connected with a low-velocity bubbling fluid-bed ASG, which can be heated by the hot solids returning from the circulating fluid bed. For example, sand having dimensions that are approximately 350-μm can be used. However, one skilled in the art will appreciate other material and/or other dimensions of materials can be used. For many methods, a substantial sand or other material recirculation rate is required to supply enough heat required for gasification.

One feature of the apparatus of the present teaching is that the interconnected side-by-side fluid-bed configuration described herein can be more efficient at keeping the syngas and the products of syngas combustion flue gas stream separated. Furthermore, this configuration can also results in reasonable solid flux rates, less solid entrainment into the syngas, and more flexibility in vessel heights and diameters while simultaneously allowing for better separation of micronized char from the gasifier solids flowing to the combustor mix pot. These features are desirable in that they minimize the oxidation of char into the flue gas.

In operation, the heated sand and products of combustion (POC) gases are separated by the POC cyclone 408. The moving bed of hot sand from the bottom of the POC cyclone 408 provides the gas seal between the gasifier 410 and the combustor loop sections 404. The heated sand in the circulating fluid bed is in fluid communication with the low-velocity bubbling fluid-bed, which is the actual gasification portion of the ASG indirect gasifier 400. The sand is transferred to the gasifier 410 from the POC cyclone 408 via a dipleg and an automatic L-valve 409. The hot sand provides the required heat for the steam-carbon reaction in the gasifier section 410. The bubbling bed gasifier section provides turbulent solids intermingling of the hot sand and the micronized char, which promotes gasification of the char. The turbulent flow in the bubbling bed also supports separation of more dense sand particles from char and residue ash. Sand with minimal char entrainment settles to the bottom of the bubbling bed and ultimately moves into the downcomer of the combustion section of the combustor 404. Furthermore, sand-char separation is facilitated by injecting steam into the gasifier above the entrance to the downcomer. The sand-filler downcomer provides a gas seal between the combustor 404 and gasifier 410 sections of the ASG indirect gasifier 400. The moving bed of sand is transferred into the bottom of the mixing pot 402 for reheating via the L-valve 409.

Sand attrits as it loops within the ASG indirect gasifier 400. In the gasifier section, the high operating pressure and high viscosities of the gas produce a substantial drag on the particles. This strong drag force can cause some smaller sand particles to be carried out of the gasifier in the syngas exit stream along with fine, micronized ash and residual carbon. The sand particles are large and heavy and should be removed from this stream before the syngas stream enters the heat recovery heat exchangers and solids filter. The gasifier can also have a cyclone in some embodiments. The POC cyclone 408 positioned in the syngas exit stream remove the larger, heavier sand particles. The sand is then recirculated back into the gasifier section via the L-valve 409.

The syngas stream leaving the ASG indirect gasifier 400 will contain some unconverted carbon. In some embodiments, a second ASG system is employed to provide a second stage of gasification to attain near complete carbon conversion.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:
1. An all-steam gasification system for polygeneration with carbon capture, the system comprising:
   a) a devolatilizer that pyrolyzes solid fuel to produce char and gases, the devolatilizer comprising:
      i) a devolatilizer burner having at least one input that receives gases comprising hydrogen, oxygen and steam or gases comprising syngas, steam, and a mixture of oxygen and carbon dioxide, the devolatilizer burner adding exothermic heat to the devolatilizer by high-pressure sub-stoichiometric combustion of the received gases to eliminate substantially all oxidation of char in the devolatilizer;
      ii) a devolatilizer mixing pot having an input coupled to an output of the devolatilizer burner and a solid fuel input that receives solid fuel, the devolatilizer mixing pot configured to cause a turbulent flow of hot gases provided by the devolatilizer burner to heat the received solid fuel and to generate friable char, pyrolysis gas, and steam at an output;
      iii) a riser having an input that is coupled to the output of the devolatilizer mixing pot, the riser micronizing the friable char and providing the micronized char with volatiles and steam to an output;
iv) a devolatilizer cyclone having an input that is coupled to the output of the riser, the devolatilizer cyclone separating the micronized char by weight providing sufficiently micronized char, steam and pyrolysis gases to a first output and providing oversized micronized char to a second output; and
v) a standpipe having an input that is coupled to the second output of the devolatilizer cyclone and an output that is connected to a recycling input of the devolatilizer mixing pot through a valve; and b) an all-steam indirect fluid bed gasifier combustion loop comprising:
i) a gasifier having an input coupled to the second output of the devolatilizer cyclone, an input for receiving steam to provide oxygen for gasification reactions and to facilitate sand-char separation, and an output that provides syngas;
ii) a gasifier burner having an input that receives gases comprising hydrogen and air or gases comprising syngas and a mixture of oxygen and carbon dioxide and that provides products of combustion at an output;
iii) a gasifier mixing pot comprising sand having an input coupled to the output of the gasifier burner, the gasifier mixing pot providing hot sand with the products of combustion at an output and having a solids input for receiving recycled sand from the gasifier;
iv) a riser having an input that is coupled to the output of the gasifier mixing pot, the riser transporting heated sand and products of combustion to an output; and
v) a products of combustion cyclone having an input coupled to the output of the riser and a solids output coupled to a solids input of the gasifier through a valve, the products of combustion cyclone separating the hot sand and products of combustion by weight and providing products of combustion to a products output and sand for a steam-carbon reaction to the solids output.

2. The all-steam gasification system of claim 1 wherein the valve connecting the output of the standpipe to the recycling input of the devolatilizer mixing pot devolatilizer is configured to provide a desired flow rate of the oversized micronized char into the devolatilizer mixing pot.

3. The all-steam gasification system of claim 1 wherein the valve connecting the output of the standpipe to the recycling input of the devolatilizer mixing pot is configured to regulate aeration and solids level into the devolatilizer mixing pot by using a fluffing gas.

4. The all-steam gasification system of claim 1 wherein the valve connecting the output of the standpipe to the recycling input of the devolatilizer mixing pot comprises a non-mechanical valve.

5. The all-steam gasification system of claim 1 wherein the devolatilizer mixing pot is configured to cause the received solid fuel at the solid fuel input to swell up and become friable.

6. The all-steam gasification system of claim 1 wherein the riser and devolatilizer cyclone micronizes the char into 10- to 20-μm sized particles by impacting solids in the devolatilizer cyclone.

7. The all-steam gasification system of claim 1 wherein the riser in the devolatilizer is configured to operate in a turbulent fluidized-bed mode.

8. The all-steam gasification system of claim 1 wherein the riser in the devolatilizer is configured to achieve a turbulent flow that is greater than or equal to 100 feet per second.

9. The all-steam gasification system of claim 1 wherein the devolatilizer cyclone is a multistage cyclone.

10. The all-steam gasification system of claim 1 wherein the solid fuel input is configured to receive coal.

11. The all-steam gasification system of claim 1 wherein the solid fuel input is configured to receive biomass.

12. The all-steam gasification system of claim 1 wherein the solid fuel input is configured to receive plastic.

13. The all-steam gasification system of claim 1 wherein the valve coupling the solids output of the products of combustion cyclone to the solids input of the gasifier is an L-valve.

14. The all-steam gasification system of claim 1 further comprising a syngas cooler having an input coupled to the output of the gasifier.

15. The all-steam gasification system of claim 14 further comprising a syngas cleanup system coupled an output of the syngas cooler, the syngas cleanup system is configured to clean the cooled syngas.

16. The all-steam gasification system of claim 15 further comprising a carbon capture reactor with water gas shift and steam methane reforming that receives the cleaned cooled syngas and produces hydrogen for a power block or a solid fuel to liquids system.

* * * * *